(12) United States Patent  
Kahle (10) Patent No.: US 7,100,293 B2
(45) Date of Patent: Sep. 5, 2006

(54) LASER ALIGNMENT TOOL ADAPTER (75) Inventor: Kent W. Kahle, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 4 days.

(21) Appl. No.: 10/900,960

(22) Filed: Jul. 28, 2004

(65) Prior Publication Data
US 2006/0156563 A1 Jul. 20, 2006

(51) Int. Cl.
*G01C 15/10* (2006.01)

(52) U.S. Cl. ............. 33/290; 33/227; 33/DIG. 21
(58) Field of Classification Search ........ 33/286, 33/290, 227, DIG. 21
See application file for complete search history.

(56) References Cited

U.S. PATENT DOCUMENTS

| 4,476,635 A * | 10/1984 | Hart ............... 33/228 |
| 5,025,966 A * | 6/1991 | Potter ............. 224/183 |
| 5,075,977 A | 12/1991 | Rando |
| 5,388,741 A * | 2/1995 | Hillinger ........... 224/679 |
| 5,400,514 A | 3/1995 | Imbrie et al. |
| 5,594,993 A * | 1/1997 | Tager et al. ......... 33/227 |
| 6,029,360 A * | 2/2000 | Koch ............... 33/382 |
| 6,173,502 B1 * | 1/2001 | Scarborough ....... 33/371 |
| 6,209,219 B1 * | 4/2001 | Wakefield et al. .... 33/761 |
| 6,532,676 B1 * | 3/2003 | Cunningham ....... 33/286 |
| 6,935,034 B1 * | 8/2005 | Malard et al. ....... 33/286 |
| 2003/0061720 A1 | 4/2003 | Walbel |
| 2004/0045992 A1 * | 3/2004 | Dohn ............... 224/673 |
| 2004/0124220 A1 * | 7/2004 | Blechman .......... 224/162 |
| 2005/0102848 A1 * | 5/2005 | Murphy ............ 33/227 |

* cited by examiner

Primary Examiner—Yaritza Guadalupe-McCall
(74) Attorney, Agent, or Firm—Dinsmore & Shohl LLP (57) ABSTRACT An adapter providing increased versatility to a laser alignment tool is disclosed. Accessories of the adapter are disclosed for use with a laser alignment tool which may or may not be self-leveling. The accessories include one or more laser reference diffraction elements, effective to receive an incoming laser reference and produce a laser reference deviated a predetermined angular amount, and various attachment features.

49 Claims, 10 Drawing Sheets

LASER ALIGNMENT TOOL ADAPTER

BACKGROUND OF THE INVENTION

This invention relates to laser alignment tools and in particular, to an adapter providing increased versatility to a self-leveling laser alignment tool.

A variety of survey and carpentry tools has previously employed lasers to improve accuracy and reliability of leveling. To improve the accuracy of such laser alignment tools further, there are several methods to self-level automatically either the laser or a reflective surface within the laser alignment tool.

Although these prior art laser alignment tools have been useful for their intended purposes, a desire for improvements still remains.

SUMMARY OF THE INVENTION

The present invention provides an adapter providing increased versatility to a self-leveling laser alignment tool when attached thereto. In one embodiment, the adapter comprises a body having two opposed wall portions, defining a space therebetween, and a base portion. The laser alignment tool is releasably mountable in the space. The base portion has a pair of cylindrical though-bores and a pair of orthogonal slotted throughbores. A belt clip is provided to one of the wall portions.

In another embodiment, an adapter providing increased versatility to a self-leveling laser alignment tool providing at least a pair of laser references when attached thereto is disclosed. The adapter comprises a body having two opposed wall portions defining a space therebetween and a base portion. The laser alignment tool is releasably mountable in the space. A belt clip is provided to one of the wall portions. An arm is also provided to one of the wall portions. The arm is moveable between a stowed position and an extended position. The arm has a prism, wherein the prism deviates one of the pair of laser references when situated in the extended position.

These and other features and advantages of the invention will be more fully understood from the following description of the various embodiments of the invention taken together with the accompanying drawing. It is noted that the scope of the claims is defined by the recitations therein, and not by the specific discussion of features and advantages set forth in the present description.

BRIEF DESCRIPTION OF THE DRAWINGS

The organization and manner of operation of the invention, together with further objects and advantages thereof, may best be understood by reference to the following description taken in connection with the accompanying drawing in which.

DETAILED DESCRIPTION OF THE VARIOUS EMBODIMENTS

While the invention may be susceptible to various embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

Skilled artisans appreciate that elements in the drawing are illustrated for simplicity and clarity and have not necessarily been drawn to scale. For example, the dimensions of some of the elements in the drawing may be exaggerated relative to other elements to help to improve understanding of the various embodiments of the present invention.

Figure 1:
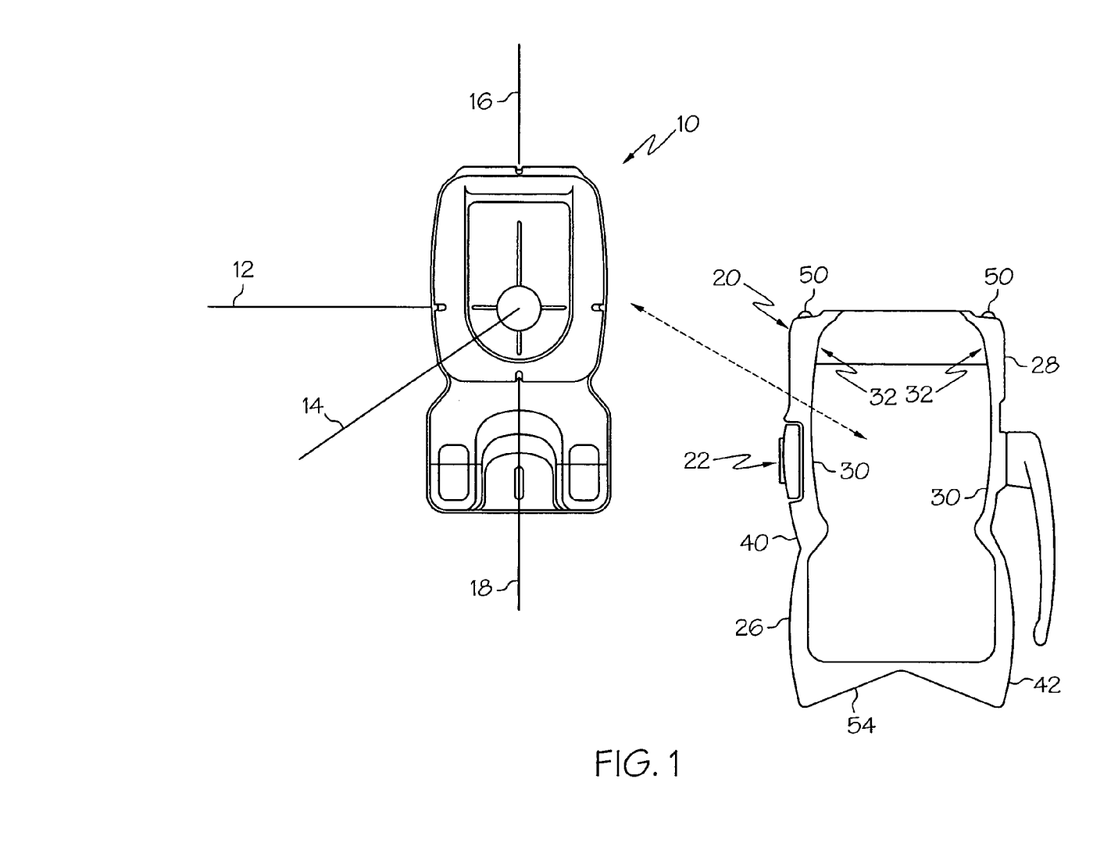
FIG. 1 is front view of one embodiment of an adapter provided with a movable laser reference deviation accessory and belt clip provided on the sides thereof, and being shown with a laser alignment tool to show the details for snapping the adapter to the housing of the laser alignment tool.

FIG. 1 shows generally one illustrative embodiment of a compact self-leveling laser alignment tool for projecting plumb and level laser references for precise alignment. By "laser reference" or "laser references" it is meant to include projected laser beams, laser points, laser lines, laser crosslines, laser planes, and combinations thereof. One suitable compact laser alignment tool is described in U.S. Pat. No. 5,075,977, assigned to the same assignee as the present invention. The disclosure of that patent is incorporated herein by reference. The present invention is used in conjunction with such a compact battery operated laser alignment tool of the type described in the above mentioned patent as well as with other multi-beam self-leveling and some manually leveled laser instruments. Such a generic laser alignment tool can be considered as generally shown by 10 in FIG. 1.

As shown by FIG. 1, the laser alignment tool 10 projects at least two laser references 12 and 14. In the illustrated embodiment, the laser references 12 ands 14 are projected simultaneously at 90° to each other. When the laser alignment tool 10 is used in the upright position, the projected laser references 12 and 14 are level in the horizontal plane and make a precise right angle as needed in construction applications. In other laser alignment tools, additional laser references 16 and 18 may be provided that project laser references that are perpendicular (i.e., plumb) to the horizontal plane when the laser alignment tool 10 is in the upright position, such as is shown, and combinations thereof.

Figure 2A:
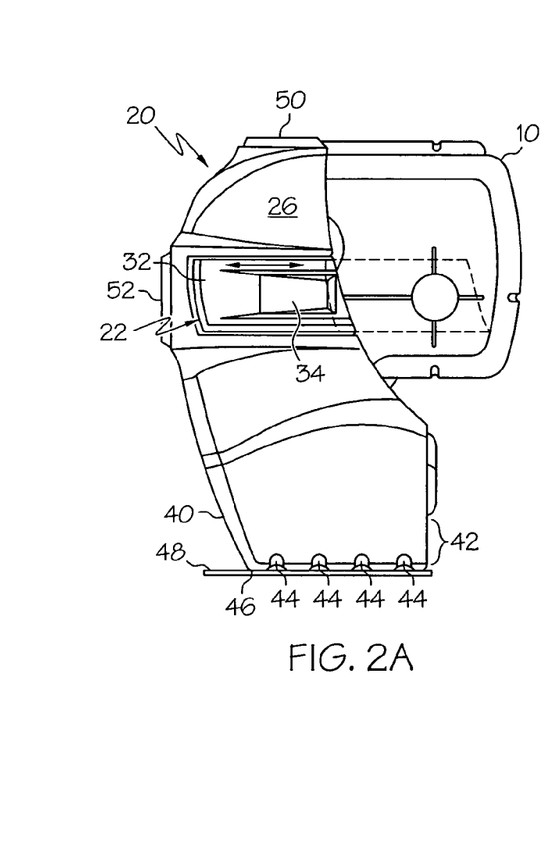
FIGS. 2A and 2B are side and front views of the adapter of FIG. 1 accommodating the laser alignment tool and provided with a laser reference deviation accessory that is slidably mounted to the side of the adapter.
Figure 2B:
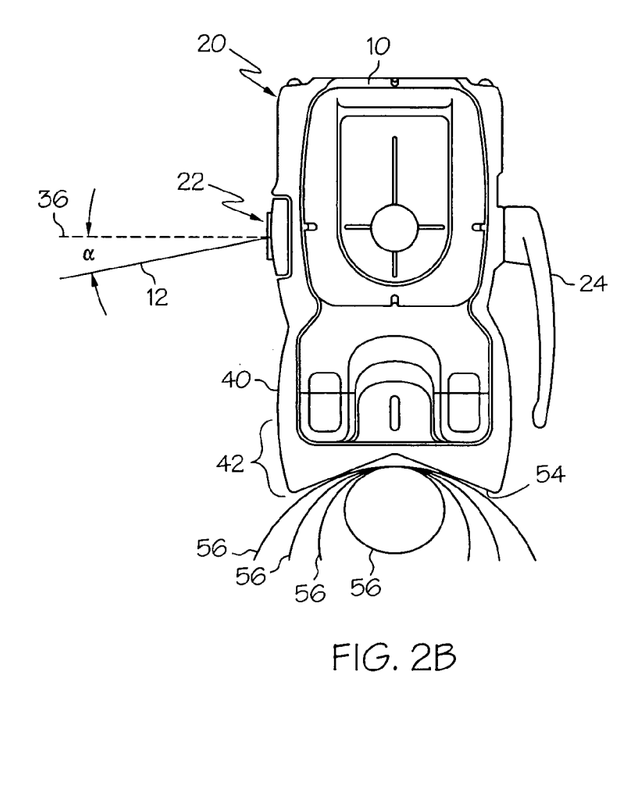

As also shown by FIG. 1, a front view of one embodiment of an adapter according to the present invention, which is generally indicated by symbol 20. As discussed herein, the adapter 20 provides added versatility to the held laser alignment tool 10. In one embodiment, the adapter 20 is provided with a laser reference deviation accessory, generally indicated by symbol 22, and a belt clip 24. The laser reference deviation accessory 22 and belt clip 24 are provided on sides or wall portions 26 and 28 of the adapter 20. Details or contours of an interior surface 30 of the adapter 20 is so shaped such that the laser alignment tool 10 snaps or snuggly fits into a space, generally indicated by symbol 32, provided between the wall portion 26 and 28, such as illustrated in FIGS. 2A and 2B. It is to be appreciated that the laser alignment tool 10 is therefore releasably mountable in the space 32 provided by the adapter 20.

FIGS. 2A and 2B are side and front views of the adapter 20 of FIG. 1 accommodating the laser alignment tool 10. As best shown by FIG. 2A, the laser reference deviation accessory 22 comprises an arm 32 and a lens or prism 34. In the illustrated embodiment, the arm 32 is slidably mounted to the wall portion 26 of the adapter 20. The arm 32 is moveable between a stowed position and an extended position, which is illustrated by the dashed lines in FIG. 2A. It is to be appreciated that the prism 34 deviates one of the pair of laser references, such as reference 12, a predetermined angular amount α from the laser references normal path, which defines a horizontal plane 36, when the arm 32 is situated in the extended position. The predetermined angular amount α of prism 34 is an angle in the range from about 1 degree to about 45 degrees.

Figure 3:
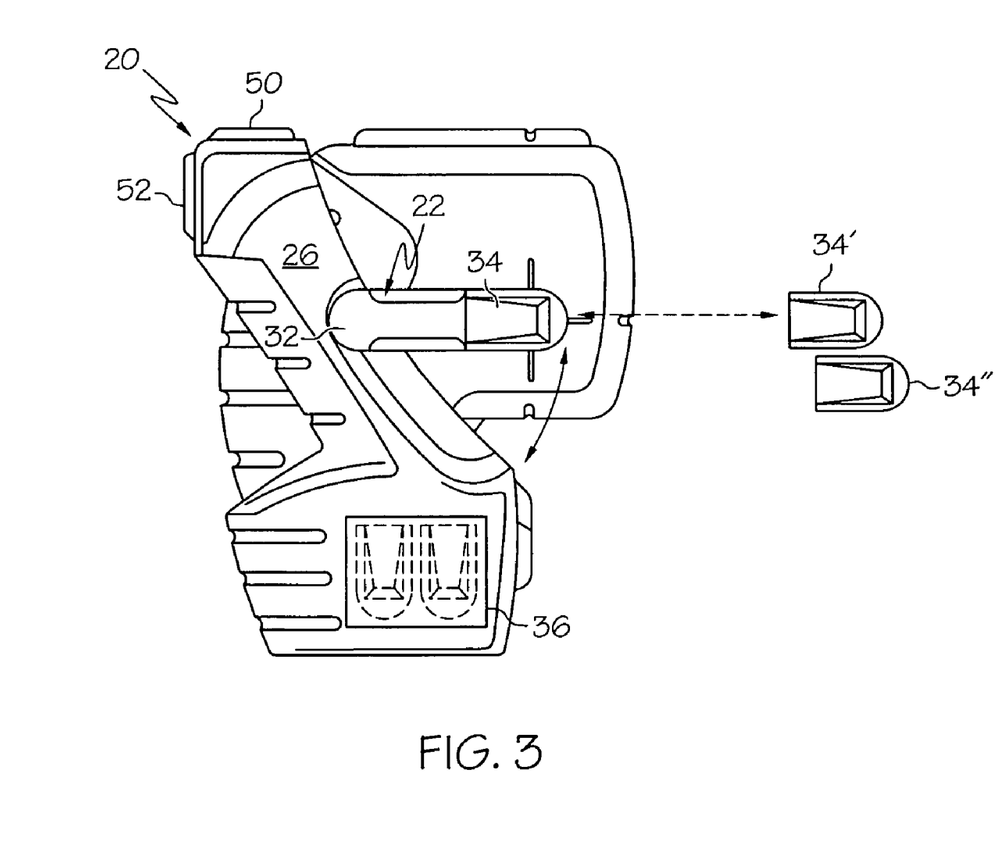
FIG. 3 is a side view of another embodiment of an adapter for a laser alignment tool and provided with a laser reference deviation accessory that is rotatably mounted to the side of the adapter, and having a plurality of interchangeable prisms providing various angles of deviation from a horizontal plane of a laser reference from laser alignment tool.

FIG. 3 shows a side view of another embodiment of the adapter 20 according to the present invention provided with a laser reference deviation accessory 22 that is rotatably mounted to the side wall portion 26 of the adapter. In the illustrated embodiment, the arm 32 rotates between the stowed position and the extended position. In another embodiment, the arm 32 releasably secures the prism 34. Accordingly, the adapter 20 may having a plurality of interchangeable prisms 34', 34" each providing a different angle α of deviation. In another embodiment, the adapter 22 is provided with a storage space 36 for holding the extra prisms 34' and 34".

Figure 4A:
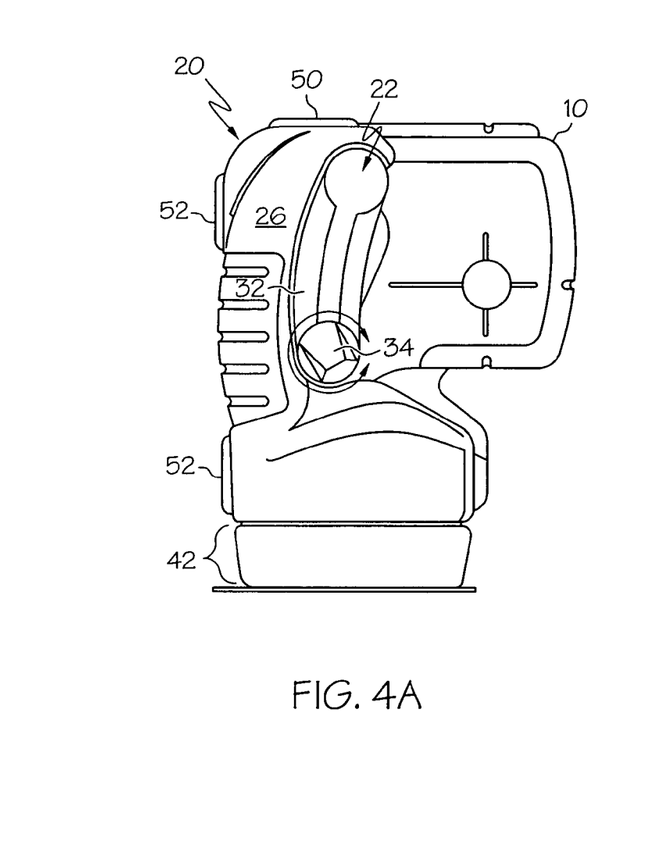
FIG. 4A is a side view of another embodiment of an adapter for a laser alignment tool and provided with a laser reference deviation accessory that is rotatably mounted to the side of the adapter, the laser reference deviation accessory having a lens or prism that may be rotated to change the direction of the deviated laser reference from the laser alignment tool.

In other embodiment illustrated by FIG. 4A, the arm 32 of the laser reference deviation accessory 22 rotatably mounts the prism 34. In this embodiment, the prism 34 that may be rotated 360° degrees such that the laser reference, deviated the predetermine angle α, may be projected in a desired direction.

Turning back to FIGS. 1, 2A, and 2B and as illustrated, the two opposed wall portions 26 and 28 are provided as part of a body 40 which further includes a base portion 42. It is to be appreciated that in one embodiment, the base portion 42 has a height that places that the bottom surface of the laser alignment tool 10 when held by the adapter 20 at approximately the height of a standard wall track of about 1⅝". In other embodiments, other base portion dimensions to accommodate non-standard wall track heights may be also provided.

In one embodiment illustrated by FIG. 2A, the base portion 42 a plurality of magnets 44 situated about a bottom surface 46 thereof. Such magnets 44 are useful in securing the laser alignment tool 10 when held in the adapter 20 to a magnetically attractive surface 48, such as a metal beam, metal wall, and the like, thereby increasing the versatility of the laser alignment tool. Additional magnets 50 and 52 in other embodiments may be provided to upper and back sides of each wall portion 26 and 28 of the adapter 20 for similar purposes.

In another embodiment, the base portion 42 of the adapter 20 is provides a v-shaped or v-groove bottom 54, which is best shown in FIGS. 1 and 2B. As illustrated by FIG. 2B, the v-groove bottom 54 is so shaped that the adapter 20 and the held laser alignment tool 10 may be situated securely on to a pipe 56 having a variable diameter range from about ½ inch to about 6 inches. The v-groove bottom 54 in one embodiment has a plurality of magnets 44 (FIG. 2A) to securely mount the adapter 20 and the held laser alignment tool 10 to the pipe 56. Other manners of securely mounting the adapter 20 and the held laser alignment tool 10 to pipes of various diameters is illustrated by FIGS. 4B, 5, and 6.

Figure 4B:
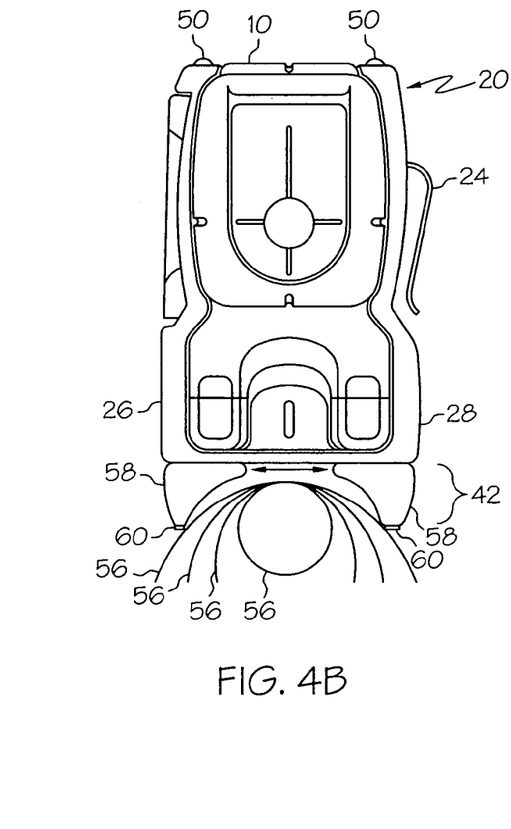
FIG. 4B is a front view of the adapter of FIG. 4A showing adjustable legs such that the laser alignment tool adapter may be situated on pipes of various diameters.
Figure 6:
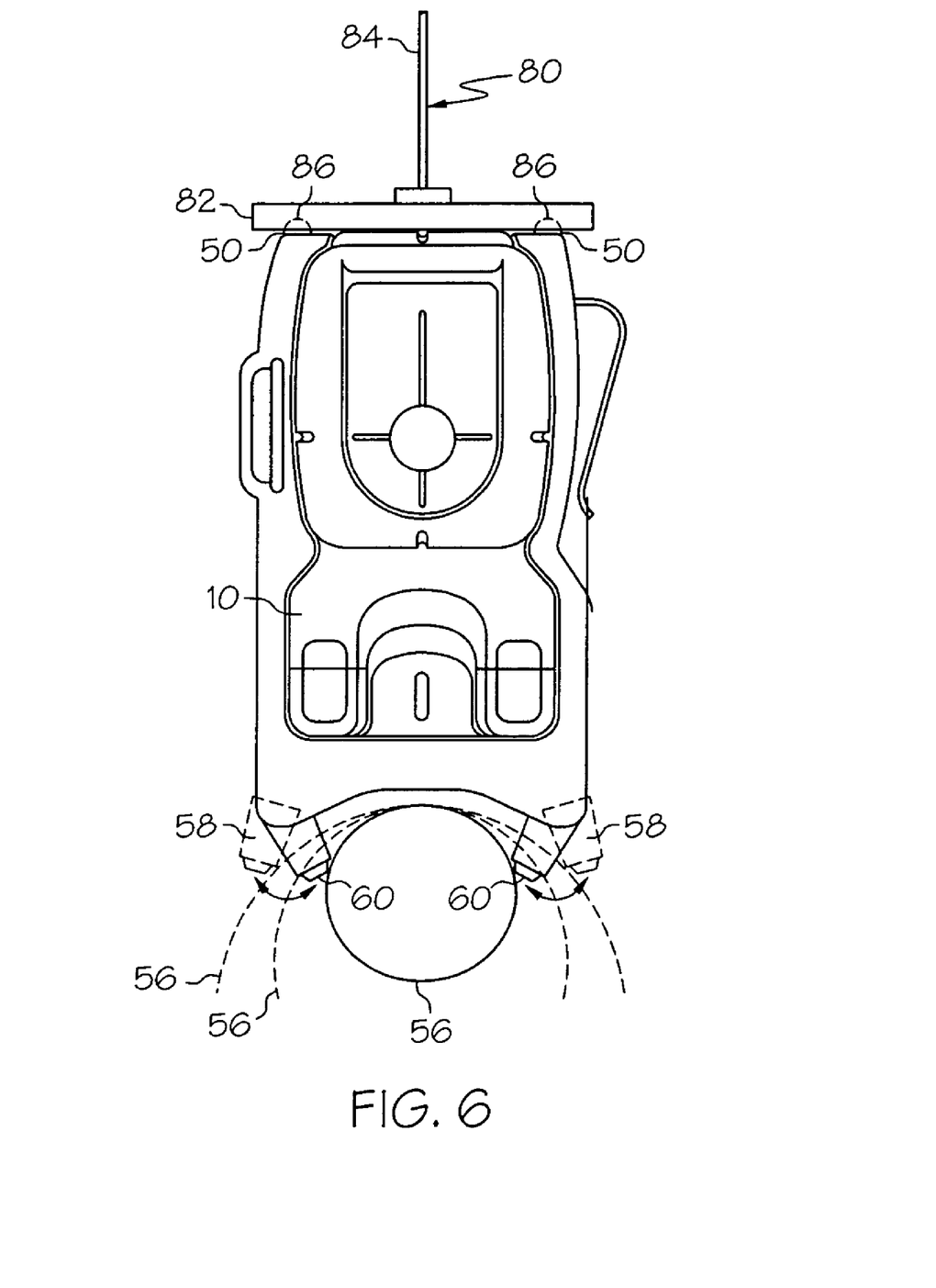
FIG. 6 is a front view of another embodiment of an adapter for a laser alignment tool, and having a pair of rotatably mounted legs to accommodate pipes of various diameters, and also illustrated a hanging accessory by which the adapter and laser alignment tool may be suspended therefrom.

As shown by FIGS. 4B and 6, the base portion 42 of the adapter 20 comprises a pair of legs 58 which are movable relative to each other. In the embodiment illustrated by FIG. 4B, the legs 58 slide in and out relative to each other, and in the embodiment shown by FIG. 6, the legs 58 rotate in and out relative to each other. Each said pair of legs having magnets 60. In such an arrangement, the legs 58 are therefore moved such that they may be adjusted accordingly such that the magnets 60 securely engage the pipe 56.

Figure 5:
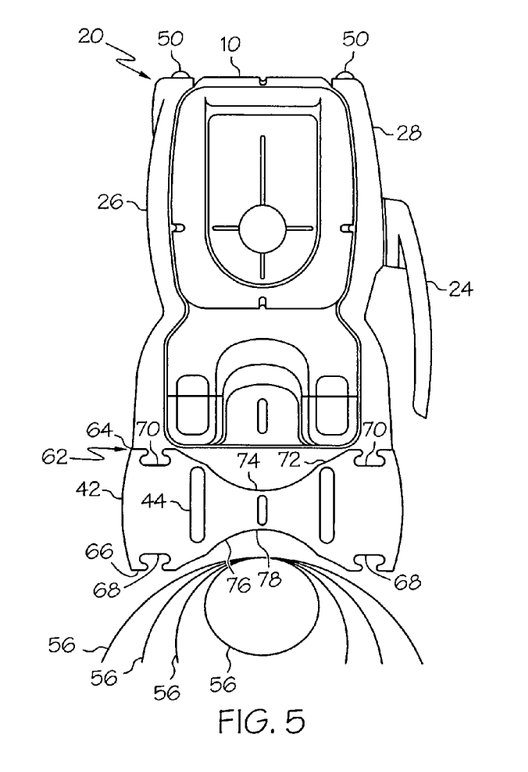
FIG. 5 is a front view of another embodiment of an adapter for holding a laser alignment tool, and providing a base having opposing bottom side curvatures to accommodate pipes of various diameters. The base being adapted to be removed, flipped over, and remounted to the adapter.

In the embodiment illustrated by FIG. 5, the base portion 42 is releasably mounted to the wall portions 26 and 28 via a tongue and groove arrangement, generally indicated by symbol 62. In particular, the base portion 42 of the adapter 20 on first and second bottom sides 64 and 66 is provided with groove portions 68 which releasably mounts to tongue portions 70 provided at ends of the wall portions 26 and 28. It is to be appreciated that the first bottom side 64 has first and second surface curvatures 72 and 74, respectively, and the second bottom side 66 has third and fourth surface curvatures 76 and 78, respectively.

Each of the surface curvatures 72, 74, 76, and 78 matches a variable pipe curvature range of about ½ inch to about 6 inches. Accordingly, the base portion 42 may be flipped over such that either the first bottom side 64 or the second bottom side 66 can be used to accommodate pipes 56 of various sizes. Other securing features provided by the adapter 20 are illustrated by FIGS. 6, 7A, 7B, 7C, 8A, and 8B, which further increase the versatility of the held laser alignment tool 10 and which are discussed hereafter.

A hanging accessory, generally indicated by symbol 80, is shown by FIG. 6. The hanging accessory 80 includes an attachment plate 82 mounted to a support 84. The plate 82 is metal such that the upper magnets 50 of the adapter are attracted thereto. Alignment grooves 86 may be provided in the plate 82 such that the adapter 20 and the held laser alignment tool 20 may be situated in a desired orientation. In still another embodiment, a tongue and groove attachment arrangement, such as illustrated in FIG. 5 between the wall portions 26 and 28 and base portion 42, may be also provided between the adapter 20 and the plate 82.

The support 84 may be mounted to a ceiling or beam (not shown) in any conventional manner. In one embodiment, the support 84 is rotatably mounted to the plate 86, such that the plate may be rotated 360° and held in a desired position. Friction or a lock between the support 84 and plate 82 may be used to hold the adapter 20 and the held laser alignment tool 10 in the desired position when attached thereto.

Figure 7A:
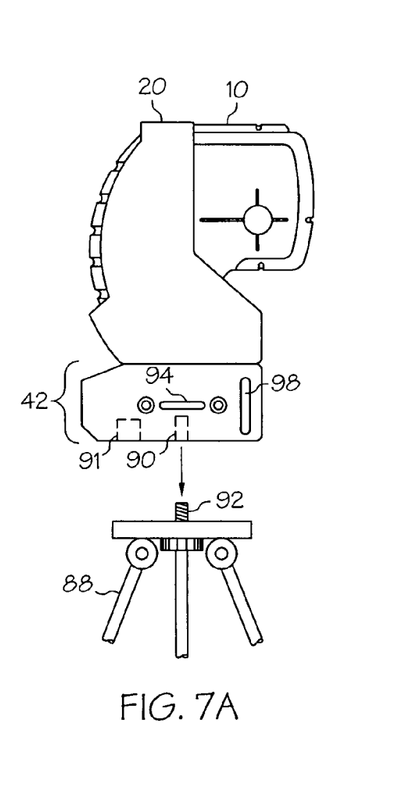
FIG. 7A is a side view of another embodiment of an adapter for a laser alignment tool that is adapted to be mounted to a tripod.
Figure 7B:
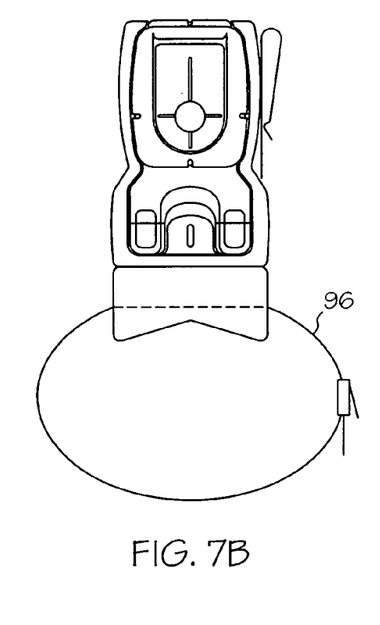
FIG. 7B is a front view of the adapter of FIG. 7A, and illustrates that a provided horizontal slotted throughbore is sized to accommodate a strap.

FIG. 7A is a side view of another embodiment of the adapter 20 that is adapted to be mounted to a tripod 88. In one embodiment, a thread barrel or nut 90 is provided in the base portion that attaches to a knurled screw 92 of the tripod. In still another embodiment, a hole 91 is also provided in the base that accommodates a close fit to a ⅝–11 tripod. Additionally, the base portion 42 is provided with a horizontal slotted throughbore 94 that is sized to accommodate a strap 96 having a width up to about 2 inches, as illustrated by FIG. 7B. Another slotted throughbore 98 is provided orthogonal to the horizontal throughbore 94 for added mounting versatility.

Figure 7C:
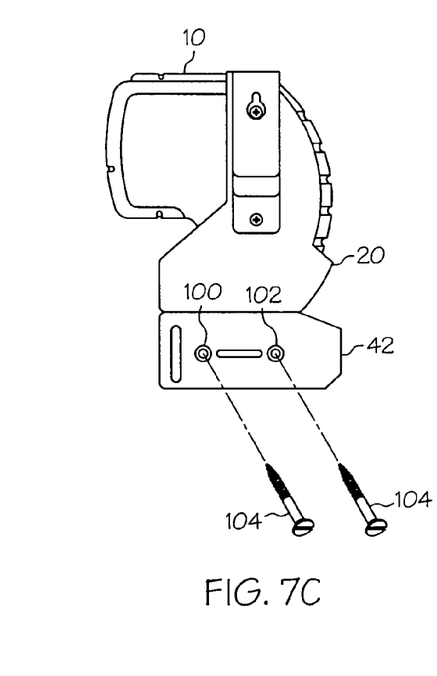
FIG. 7C is a side view of the adapter of FIG. 7A, and illustrates that a provided pair of cylindrical throughbores is sized to accommodate conventional screws having a shank diameter up to about ¼ inch.

Furthermore as illustrated by FIG. 7C, a pair of cylindrical throughbores 100 and 102 is provide to the base portion 42, and each are sized to accommodate conventional screws 104 having a shank diameter up to about ¼ inch. Such screws, such as standard 1⅝" drywall screws, can be placed in the cylindrical throughbores 100 and 102, and drilled into a wall, stud, or beam using a standard drywall screw bit held in an typical drill extension or quick chuck to secure the adapter 20 thereto. It is to be appreciated that in one embodiment the cylindrical throughbores 100 and 102 are sized also to accommodate such a quick chuck bit such that the 1⅝" drywall screws will extend out the other end of the cylindrical throughbores about 0.8 of an inch.

Figure 8A:
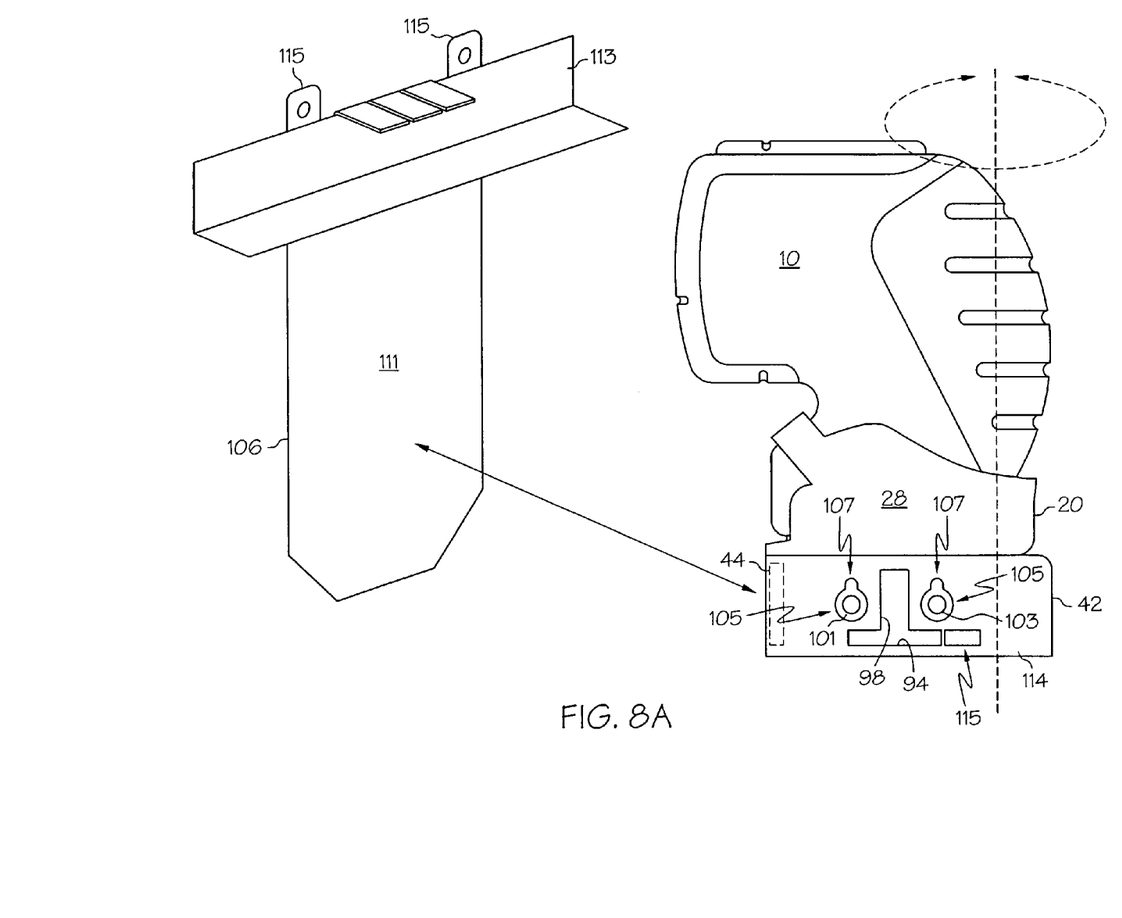
FIG. 8A is a side view of another embodiment of an adapter for a laser alignment tool provided with a pair of keyhole shaped throughbores and a pair of orthogonal slotted throughbores or toggle slots, and provided with a wall mounting accessory by which the adapter and laser alignment tool may be suspended therefrom.

FIG. 8A is a side view of another embodiment of the adapter 20 according to the present invention. As shown, the base portion 42 of the adapter 20 is provided with the pair of orthogonal slotted throughbores 94 and 98 provided in a T-shaped or toggle slot arrangement. Such a T-shaped arrangement of slotted throughbores 94 and 98 allows a user to move a strap from a horizontal position to a vertical position, or vice versa, without the need for removing a held strap. The base portion 42 is also provided with a pair of keyhole shaped throughbores 101 and 103. Each keyhole shaped throughbore 101 and 103 is sized such that the adapter 20 may be hung from a conventional screw shank with the head of the screw passing into a cylindrical portion 105 of the throughbore and the shank of the screw resting securely in an arc portion 107 of the throughbore.

The adapter 20 is also shown with a wall mounting accessory 106 by which the adapter and laser alignment tool may be suspended therefrom by included magnets 44 situated in the base portion 42 on a vertical side. The wall mounting accessory 106 has a larger plate portion 111 upon which to position the adapter 20, and an angle wall molding 113. In one embodiment, the angle wall molding measures ⅞" by ⅞", and has eyelets 115 by which to fasten the wall mounting accessory to a wall, stud, or beam. The eyelets in one embodiment are sized to accommodate standard drywall screws. The base portion 42 and the upper wall portions 26 and 28 are rotatable relative to each other, as indicated by the arrows. In particular, a swivel joint 114 is provided between the base portion 42 and the upper wall portions 26 and 28 to permits 360° of rotation. In the illustrated embodiment, the swivel joint 114 is offset from the middle of the base portion 42 such that the laser alignment tool when held in the adapter 20 and mounted to the wall mounting accessory 106, the laser alignment tool 20 may rotate 180° without interference from the wall mounting accessory 106.

Figure 8B:
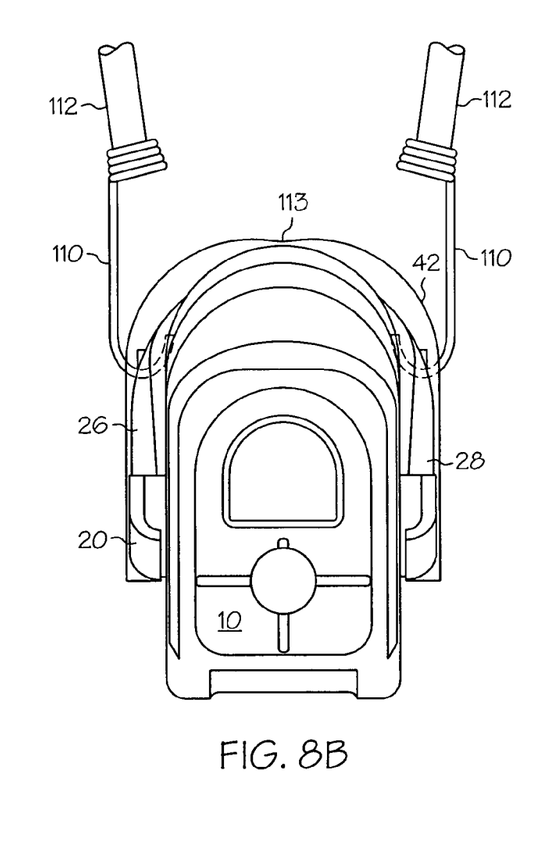
FIG. 8B is a top view of the embodiment of FIG. 8A, showing the toggle slots being used to accommodate a hook of a bungee cord or strap, and having a v-groove back portion suitable to accommodate pipes having various diameters ranging from ½ inch to about 6 inches and to which the adapter and laser alignment tool may be secured.

FIG. 8B is a top view of the embodiment of FIG. 8A, showing the toggles slots 94 and 98 being used to accommodate a hook 110 of a bungee cord or strap 112. The hook 110 fits into the lower toggle slot 94 and is accommodated around a curved portion 115 provided at one end of the lower toggle slot (FIG. 8A). Also shown by FIG. 8B, is the base portion 42 having a v-groove back 113 suitable to accommodate pipes having various diameters ranging from ½ inch to about 6 inches and to which the adapter and laser alignment tool may be secured.

Figure 9A:
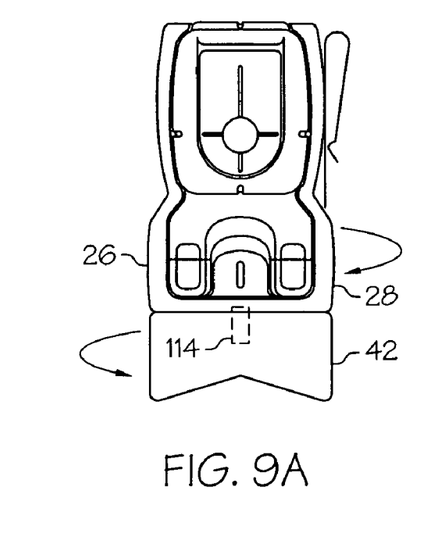
FIG. 9A is a front view of another embodiment of an adapter for a laser alignment tool that has base portion and an upper portion that rotate relative to each other.
Figure 9B:
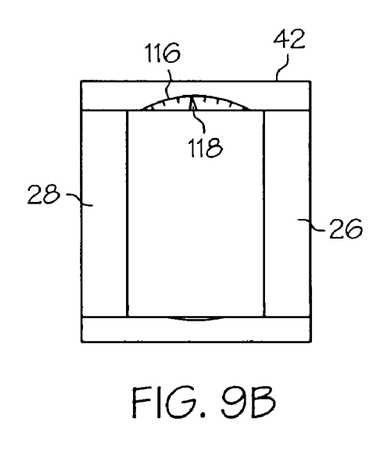
FIG. 9B is a top view of the adapter of FIG. 9A without the laser level and showing an azimuth scale and reference mark.

FIG. 9A is a front view of another embodiment of the adapter 10 according to the present invention. As shown, the base portion 42 and the upper wall portions 26 and 28 are rotatable relative to each other, as indicated by the arrows. In particular, the swivel joint 114 is provided centered between the base portion 42 and the upper wall portions 26 and 28 to permit 360° of rotation therebetween. A top view of the adapter 20, without the laser alignment tool 10 held thereby, is shown by FIG. 9B. As illustrated and in this embodiment, an azimuth scale 116 is provided to the base portion 42. A reference mark 118 is also provided and is centered between the upper wall portions 26 and 28, such that upon rotation of the wall portions, displacement of the laser references 12 and 14 (FIG. 1) from a reference on the base portion 42 can be determined.

It is to be appreciated that in the embodiment illustrated by FIGS. 1, 2A, 2B, 3, and 4A, 4B, and 6, the base portion 42 is integral with the opposed wall portions 26 and 28. In the embodiments of FIG. 5, the base portion 42 is releasably mounted to the opposed wall portions 26 and 28. In the embodiments of FIGS. 7A, 7B, 7C, 8A, 8B, 9A, and 9B the base portion 42 is rotatably mounted to the wall portions 26 and 28.

The above described embodiments are intended to illustrate the principles of the invention, not to limit its scope. Other embodiments in variations to these preferred embodiments will be apparent to those skilled in the art and may be made without departing from the spirit and scope of the invention as defined in the following claims.

What is claimed is:

1. An adapter providing increased versatility to a self-leveling laser alignment tool providing at least a pair of laser references when attached thereto, said adapter comprising:

a body having two opposed wall portions defining a space therebetween and a base portion, the laser alignment tool being releasably mountable in said space, and said base portion having a pair of cylindrical thoughbores and a pair of orthogonal slotted throughbores, said pair of orthogonal slotted throughbores are sized to accommodate a strap having a width up to about two inches; and a belt clip provided to one of said wall portions.

2. An adapter as recited in claim 1, wherein said base portion provides a plurality of magnets.

3. An adapter as recited in claim 1, wherein said base portion provides at least one of a v-groove bottom and a v-groove back.

4. An adapter as recited in claim 1, wherein said base portion provides a v-groove bottom having a plurality of magnets.

5. An adapter as recited in claim 1, wherein said base portion is integral with said opposed wall portions.

6. An adapter as recited in claim 1, wherein said base portion rotatably mounts to said wall portions.

7. An adapter as recited in claim 1, wherein said base portion provides a v-groove bottom adapted to be situated on a pipe having a diameter in the range from about ½ inch to about 6 inches.

8. An adapter as recited in claim 1, wherein said base portion is mountable to said wall portions via a tongue and groove arrangement.

9. An adapter as recited in claim 1, wherein said base portion is mountable to said wall portions via a tongue and groove arrangement provided to first and second bottom sides, said first bottom side having first and second curvatures, and said second bottom side having third and fourth curvatures, whereby said base portion is adapted to be flipped over to accommodate various pipe sizes.

10. An adapter as recited in claim 1, wherein said wall portions provide magnets.

11. An adapter as recited in claim 1, further comprises magnets provided at an upper surface of each wall portion.

12. An adapter as recited in claim 1, further comprises magnets provided at an upper surface and a side surface of each wall portion.

13. An adapter as recited in claim 1, wherein said base portion has a swivel joint for permitting rotation of said wall portions and an azimuth scale, whereby upon rotation of said wall portions displacement of the laser references from a reference on said base portion can be determined.

14. An adapter as recited in claim 1, wherein said base portion is adapted to mount to a tripod.

15. An adapter as recited in claim 1, wherein the laser alignment tool is releasably mountable in said space by a snap fit.

16. An adapter providing increased versatility to a self-leveling laser alignment tool providing at least a pair of laser references when attached thereto, said adapter comprising:

a body having two opposed wall portions defining a space therebetween and a base portion, the laser alignment tool being releasably mountable in said space, and said base portion having a pair of legs movable relative to each other, a pair of cylindrical thoughbores, and a pair of orthogonal slotted throughbores; and a belt clip provided to one of said wall portions.

17. An adapter providing increased versatility to a self-leveling laser alignment tool providing at least a pair of laser references when attached thereto, said adapter comprising:

a body having two opposed wall portions defining a space therebetween and a base portion, the laser alignment tool being releasably mountable in said space, and said base portion having a pair of legs movable relative to each other, each said pair of legs having magnets, a pair of cylindrical thoughbores, and a pair of orthogonal slotted throughbores; and a belt clip provided to one of said wall portions.

18. An adapter providing increased versatility to a self-leveling laser alignment tool providing at least a pair of laser references when attached thereto, said adapter comprising:

a body having two opposed wall portions defining a space therebetween and a base portion, the laser alignment tool being releasably mountable in said space, and said base portion having a pair of cylindrical thoughbores and a pair of orthogonal slotted throughbores, said pair of orthogonal slotted throughbores are sized to accommodate a strap having a width up to about two inches; and a belt clip provided to one of said wall portions, wherein said base portion provides magnets and is mountable to said wall portions via a tongue and groove arrangement provided to first and second bottom sides, said first bottom side having first and second curvatures, and said second bottom side having third and fourth curvatures, whereby said base portion is adapted to be flipped over to accommodate various pipe sizes.

19. An adapter providing increased versatility to a self-leveling laser alignment tool providing at least a pair of laser references when attached thereto, said adapter comprising:

a body having two opposed wall portions defining a space therebetween and a base portion, the laser alignment tool being releasably mountable in said space, and said base portion having a pair of cylindrical thoughbores and a pair of orthogonal slotted throughbores, said pair of orthogonal slotted throughbores are sized to accommodate a strap having a width up to about two inches;

a belt clip provided to one of said wall portions; and an arm provided to one of said wall portions, said arm being moveable between a stowed position and an extended position, said arm having a prism, wherein said prism deviates one of the pair of laser references when situated in said extended position, wherein said arm is slidable between said stowed and extended positions.

20. An adapter providing increased versatility to a self-leveling laser alignment tool providing at least a pair of laser references when attached thereto, said adapter comprising:

a body having two opposed wall portions defining a space therebetween and a base portion, the laser alignment tool being releasably mountable in said space, and said base portion having a pair of cylindrical thoughbores and a pair of orthogonal slotted throughbores, said pair of orthogonal slotted throughbores are sized to accommodate a strap having a width up to about two inches;

a belt clip provided to one of said wall portions; and an arm provided to one of said wall portions, said arm being moveable between a stowed position and an extended position, said arm having a prism, wherein said prism deviates one of the pair of laser references when situated in said extended position, wherein said arm is rotatable between said stowed and extended positions.

21. An adapter providing increased versatility to a self-leveling laser alignment tool providing at least a pair of laser references when attached thereto, said adapter comprising:

a body having two opposed wall portions defining a space therebetween and a base portion, the laser aliment tool being releasably mountable in said space, and said base portion having a pair of cylindrical thoughbores and a pair of orthogonal slotted throughbores, said pair of orthogonal slotted throughbores are sized to accommodate a strap having a width up to about two inches;

a belt clip provided to one of said wall portions; and magnets provided at an upper surface of each wall portion, and a plate to which said magnets attach, said plate being adapted to be suspended.

22. An adapter providing increased versatility to a self-leveling laser alignment tool providing at least a pair of laser references when attached thereto, said adapter comprising:
   a body having two opposed wall portions defining a space there between and a base portion, the laser alignment tool being releasably mountable in said space;
   a belt clip provided to one of said wall portions; and
   an arm provided to one of said wall portions, said arm being moveable between a stowed position and an extended position, said arm having a prism, wherein said prism deviates one of the pair of laser references when situated in said extended position.

23. An adapter as recited in claim 22, wherein said prism deviates the laser reference a predetermined amount in the range from about 1 degree to 45 degrees.

24. An adapter as recited in claim 22, wherein said base portion provides a plurality of magnets.

25. An adapter as recited in claim 22, wherein said base portion provides a v-groove bottom.

26. An adapter as recited in claim 22, wherein said base portion provides a v-groove bottom having a plurality of magnets.

27. An adapter as recited in claim 22, wherein said base portion is integral with said opposed wall portions.

28. An adapter as recited in claim 22, wherein said base portion rotatably mounts to said wall portions.

29. An adapter as recited in claim 22, wherein said base portion provides a v-groove bottom adapted to be situated on a pipe having a diameter in the range from about 1 inch to about 4 inches.

30. An adapter as recited in claim 22, wherein said base portion provides at least one slotted throughbore sized to accommodate a strap.

31. An adapter as recited in claim 22, wherein said base portion provides two slotted and orthogonal throughbores.

32. An adapter as recited in claim 22, wherein said base portion provides a pair of legs movable relative to each other.

33. An adapter as recited in claim 22, wherein said base portion provides a pair of legs movable relative to each other, each said pair of legs having magnets.

34. An adapter as recited in claim 22, wherein said base portion is mountable to said wall portions via a tongue and groove arrangement.

35. An adapter as recited in claim 22, wherein said base portion is mountable to said wall portions via a tongue and groove arrangement provided to first and second bottom sides, said first bottom side having first and second curvatures, and said second bottom side having third and fourth curvatures, whereby said base portion is adapted to be flipped over to accommodate various pipe sizes.

36. An adapter as recited in claim 22, wherein said base portion provides magnets and is mountable to said wall portions via a tongue and groove arrangement provided to first and second bottom sides, said first bottom side having first and second curvatures, and said second bottom side having third and fourth curvatures, whereby said base portion is adapted to be flipped over to accommodate various pipe sizes.

37. An adapter as recited in claim 22, wherein said arm is slidably between said stowed and extended positions.

38. An adapter as recited in claim 22, wherein said arm is rotatable between said stowed and extended positions.

39. An adapter as recited in claim 22, wherein said wall portions provide magnets.

40. An adapter as recited in claim 22, further comprises magnets provided at an upper surface of each wall portion.

41. An adapter as recited in claim 22, further comprises magnets provided at an upper surface and a side surface of each wall portion.

42. An adapter as recited in claim 22, wherein said base portion has a swivel joint for permitting rotation of said wall portions and an azimuth scale, whereby upon rotation of said wall portions displacement of the laser references from a reference on said base portion can be determined.

43. An adapter as recited in claim 22, wherein said base portion is adapted to mount to a tripod.

44. An adapter as recited in claim 22, wherein said base portion provides a pair of cylindrical though-bores.

45. An adapter as recited in claim 22, further comprises magnets provided at an upper surface of each wall portion, and a plate to which said magnets attach, said plate being adapted to be suspended.

46. An adapter as recited in claim 22, further comprises a tongue and groove attachment arrangement provided between a plate and said adapter.

47. An adapter as recited in claim 22, wherein the laser alignment tool is releasably mountable in said space by a snap fit.

48. An adapter as recited in claim 22, wherein said prism is a plurality of interchangeable prisms each adapted to deviate the laser reference a different predetermined amount.

49. An adapter as recited in claim 22, wherein said prism is rotatably mounted to said arm.

* * * * *

UNITED STATES PATENT AND TRADEMARK OFFICE
CERTIFICATE OF CORRECTION

PATENT NO. : 7,100,293 B2  Page 1 of 1
APPLICATION NO. : 10/900960
DATED : September 5, 2006
INVENTOR(S) : Kent Kahle It is certified that error appears in the above-identified patent and that said Letters Patent is hereby corrected as shown below:

Col. 8, Line 61, "laser aliment" should read --laser alignment--

Signed and Sealed this

Fifth Day of December, 2006

JON W. DUDAS
*Director of the United States Patent and Trademark Office*